(12) United States Patent
Kang

(10) Patent No.: US 11,769,412 B2
(45) Date of Patent: Sep. 26, 2023

(54) REAR SIDE WARNING SYSTEM AND METHOD FOR VEHICLE

(71) Applicant: HYUNDAI MOBIS CO., LTD., Seoul (KR)

(72) Inventor: Eun Seok Kang, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 18 days.

(21) Appl. No.: 17/245,199

(22) Filed: Apr. 30, 2021

(65) Prior Publication Data

US 2021/0390860 A1     Dec. 16, 2021

(30) Foreign Application Priority Data

Jun. 10, 2020 (KR) .......... 10-2020-0070591
Jun. 26, 2020 (KR) .......... 10-2020-0078364

(51) Int. Cl.
*G08G 1/16*     (2006.01)
*B60Q 9/00*     (2006.01)
*G06V 20/58*    (2022.01)

(52) U.S. Cl.
CPC ............. *G08G 1/166* (2013.01); *B60Q 9/008* (2013.01); *G06V 20/58* (2022.01); *G08G 1/165* (2013.01)

(58) Field of Classification Search
None
See application file for complete search history.

(56) References Cited

U.S. PATENT DOCUMENTS

| | | | | |
|---|---|---|---|---|
| 10,493,986 | B2 * | 12/2019 | Ratcliffe | ........... G08G 1/16 |
| 2003/0042303 | A1 * | 3/2003 | Tsikos | ........ G06K 7/10594 |
| | | | | 235/384 |
| 2004/0059503 | A1 * | 3/2004 | Peters | ............... G08G 1/08 |
| | | | | 701/96 |
| 2006/0070787 | A1 * | 4/2006 | Bartels | ........... G01S 13/931 |
| | | | | 180/271 |
| 2010/0045449 | A1 * | 2/2010 | Stein | ............... G06T 7/215 |
| | | | | 348/E5.022 |
| 2014/0035738 | A1 | 2/2014 | Kim | |
| 2014/0111369 | A1 | 4/2014 | Oh et al. | |
| 2014/0232854 | A1 * | 8/2014 | Kim | ............... H04N 7/183 |
| | | | | 348/135 |
| 2016/0162741 | A1 * | 6/2016 | Shin | ............... G06V 20/56 |
| | | | | 382/104 |
| 2016/0318511 | A1 * | 11/2016 | Rangwala | ....... B60W 30/095 |
| 2017/0003134 | A1 * | 1/2017 | Kim | ............ G08G 1/09623 |

(Continued)

FOREIGN PATENT DOCUMENTS

DE     10 2014 010 936 A1     1/2016
DE        102017124962 A1 *   4/2019

(Continued)

OTHER PUBLICATIONS

Extended European Search Report dated Feb. 25, 2022 in counterpart European Patent Application No. 21176040.0. (8 pages in English).

*Primary Examiner* — Muhammad Adnan

(74) *Attorney, Agent, or Firm* — NSIP Law

(57) ABSTRACT

A rear side warning system for a vehicle includes at least one processor configured to: sense an external obstacle of the vehicle; classify the external obstacle as either one of a fixed object and a moving object; and control a rear side warning signal of the vehicle based on a result of the classifying of the external obstacle.

9 Claims, 10 Drawing Sheets

(56) References Cited

U.S. PATENT DOCUMENTS

| | | |
|---|---|---|
| 2017/0210384 A1* | 7/2017 | Doebbelin ........ B60W 30/0953 |
| 2017/0313237 A1* | 11/2017 | Hu .......................... H05B 47/11 |
| 2017/0356994 A1* | 12/2017 | Wodrich ................. G01S 13/87 |
| 2017/0358103 A1* | 12/2017 | Shao .................. H04N 23/6845 |
| 2018/0060675 A1* | 3/2018 | Ji ........................ H04N 23/741 |
| 2018/0162274 A1 | 6/2018 | Kim et al. |
| 2019/0016316 A1* | 1/2019 | Sung ........................ B60T 7/22 |
| 2019/0248288 A1* | 8/2019 | Oba .......................... G06T 3/00 |
| 2020/0043342 A1* | 2/2020 | Cunningham .......... H04W 4/80 |
| 2020/0098268 A1* | 3/2020 | Winzell ................. G08G 1/165 |
| 2021/0264780 A1* | 8/2021 | Eilertsen ............... G08G 1/0145 |
| 2021/0270960 A1* | 9/2021 | Jo ........................... G01S 13/87 |
| 2022/0026533 A1* | 1/2022 | Inoue .................... G01S 17/931 |
| 2022/0212743 A1* | 7/2022 | Kuroba .................... B62J 50/22 |
| 2022/0348199 A1* | 11/2022 | Koo ...................... G01S 17/931 |
| 2023/0150499 A1* | 5/2023 | Choi ...................... G06V 10/60 |
| | | 701/93 |

FOREIGN PATENT DOCUMENTS

| | | |
|---|---|---|
| DE | 10 2018 124 638 A1 | 4/2020 |
| EP | 3 410 146 A1 | 12/2018 |
| KR | 10-2014-0019571 A | 2/2014 |
| KR | 10-2018-0065527 A | 6/2018 |
| WO | WO-2020069922 A1 * | 4/2020 |

* cited by examiner

REAR SIDE WARNING SYSTEM AND METHOD FOR VEHICLE

CROSS REFERENCE TO RELATED APPLICATION

This application claims the benefit under 35 U.S.C. § 119(a) of Korean Patent Application Nos. 10-2020-0070591 and 10-2020-0078364 filed on Jun. 10, 2020 and Jun. 26, 2020, respectively, in the Korean Intellectual Property Office, the entire disclosures of which are incorporated herein by reference for all purposes.

BACKGROUND OF THE INVENTION

Field of the Invention

The present invention relates to a rear side warning system and method for a vehicle.

Description of the Related Art

Cameras, radar, lidar, infrared sensors, and the like are being used to sense the surrounding situation of a vehicle. Such sensors are used in a system for preventing a vehicle accident by sensing the risk of vehicle collision and generating a warning alarm. In addition, radar, ultrasonic sensors, and the like are also being used in a system for warning a user by sensing the position and speed of another vehicle travelling on the rear side of the vehicle. The sensors are also used in determining what the object in front of the vehicle is, how far the distances to other vehicle and object are, and the like to help drivers drive.

Such conventional art played a role of an auxiliary device that assists drivers in driving by sensing vehicles, pedestrians, obstacles, and the like in front/rear of traveling vehicles.

However, the radar sensors for detecting the vehicle on the rear side do not properly sense the vehicle on the rear side caused by reflection of radar waves from a guard rail or an outer wall of a tunnel positioned on the side of the vehicle.

The matters described as the technical background are only intended to help better understanding of the background of the present invention and should not be taken as an acknowledgement that they correspond to the conventional art already known to those skilled in the related art.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect rear side warning system for a vehicle includes at least one processor configured to: sense an external obstacle of the vehicle; classify the external obstacle as either one of a fixed object and a moving object; and control a rear side warning signal of the vehicle based on a result of the classifying of the external obstacle.

The at least one processor may include: a sensing unit configured to sense the external obstacle; a determination unit configured to classify the external obstacle as either one of the fixed object and the moving object; and a control unit configured to control the rear side warning signal of the vehicle based on the result of the classifying of the external obstacle.

The sensing unit may be further configured to divide a sensing range into a grid shape formed by a plurality of longitudinal and lateral axes, and sense the external obstacle in response to a grid cell where a longitudinal and lateral axis, among the plurality of longitudinal and lateral axes, cross is occupied.

The determination unit may be further configured to determine that the external obstacle is a fixed object, in response to positions of the external obstacle being continuously sensed as being positioned within preset intervals in the longitudinal direction.

The determination unit may be further configured to calculate a lateral distance between the fixed object and the vehicle, and determine a position of the moving object positioned on the rear side of the vehicle based on the calculated lateral distance.

The control unit may be further configured to hold back generation of the rear side warning signal on a side of the fixed object in response to a change of the lateral distance, calculated by the determination unit, being less than a preset first distance.

The determination unit may be further configured to reset the position of the fixed object in response to the change of the lateral distance increasing or decreasing from a preset fourth distance.

The control unit may be further configured to hold back generation of the rear side warning signal against the moving object other than the fixed object in response to a change of the lateral distance, calculated by the determination unit, being within a preset range.

The determination unit may be further configured to determine that the vehicle enters a driving road having a limited height, in response to a number of positions of the fixed object sensed by the sensing unit during a preset time period being equal to or greater than a preset number.

The sensing unit may be further configured to sense that the fixed object is positioned a preset second distance, where the longitudinal tracking range is preset, or more away, while a number of sensed positions of the fixed object is equal to or greater than a preset number, when the determination unit determines that the vehicle enters the driving road having the limited height.

The control unit may be further configured to expand a rear side warning-keeping area of the sensing unit or increase a rear side warning-keeping time, in response to the determination unit determining that the vehicle enters the driving road having a limited height.

The determination unit may be further configured to reset a position of the fixed object in response to the vehicle moving a preset third distance or more in a longitudinal direction.

In another general aspect, a rear side warning system for a vehicle includes at least one processor configured to: check a preset rear side warning condition based on position information or movement information of a moving object sensed by the at least one processor; determine a reliability condition of a rear side warning condition checked by the at least one processor based on the position information or the movement information of the moving object; and generate a rear side warning signal of the vehicle based on the reliability condition of the rear side warning condition checked by the at least one processor, and the rear side warning condition.

The at least one processor may include: a checking unit configured to check the preset rear side warning condition based on the position information or the movement information of the moving object; a determination unit configured to determine the reliability condition of the rear side warning condition checked by the checking unit based on the position information or the movement information of the moving object; and a control unit configured to generate the rear side warning signal of the vehicle based on the reliability condition of the rear side warning condition checked by the checking unit, and the rear side warning condition.

The rear side warning system according to claim 14, wherein the position information includes longitudinal and lateral positions of the moving object, and the movement information includes longitudinal and lateral speeds of the moving object.

The sensing unit may be further configured to sense the position information and movement information of the moving object in each frame among frames. The determination unit may be further configured to set a tracking range based on the position information or the movement information of the moving object sensed in a previous frame among the frames, and determine the reliability condition of the rear side warning condition based on whether the position information or the movement information of the moving object sensed in a current frame is inside the set tracking range.

The determination unit may be further configured to cumulatively count a number of times the position information or the movement information of the moving object sensed in the current frame is outside the set tracking range, and determine that the reliability condition of the rear side warning condition is not satisfied, in response to the cumulatively counted number of times being equal to or greater than a preset first number.

The determination unit may be further configured to determine the reliability condition of the rear side warning condition based on whether the position information or the movement information of the moving object, the longitudinal distance of which to the vehicle is equal to or greater than a preset distance, is inside the preset tracking range, based on the position information of the moving object sensed in the current frame.

The sensing unit may be further configured to sense position information or movement information of an external obstacle in each frame among frames. The checking unit may be further configured to cumulatively count a number of times the position information or the movement information of the moving object sensed in each frame satisfies the preset rear side warning condition. The control unit may be further configured to generate the rear side warning signal in response to the cumulatively counted number of times the preset rear side warning condition is satisfied being equal to or greater than a preset number of warnings, and increase the preset number of warnings in response to the determination unit determining that the reliability condition of the rear side warning condition is a preset condition.

In another general aspect a rear side warning method for a vehicle includes: sensing an external obstacle of the vehicle; classifying the sensed external obstacle as either one of a fixed object and a moving object; and controlling a rear side warning signal of the vehicle based on a result of the classifying of the obstacle.

In another general aspect, a non-transitory, computer-readable storage medium stores instructions that, when executed by a processor, cause the processor to perform the method described above.

In another general aspect, a rear side warning method for a vehicle includes: sensing position information or movement information of a moving object positioned outside the vehicle; checking a preset rear side warning condition based on the position information or movement information; determining a reliability condition of the rear side warning condition, based on the position information or movement information; and generating a rear side warning signal for the vehicle, based on the reliability condition of the rear side warning condition checked in the checking, and the rear side warning condition.

In another general aspect, a non-transitory, computer-readable storage medium stores instructions that, when executed by a processor, cause the processor to perform the method described above.

Other features and aspects will be apparent from the following detailed description, the drawings, and the claims.

DETAILED DESCRIPTION OF THE INVENTION

Figure 1:
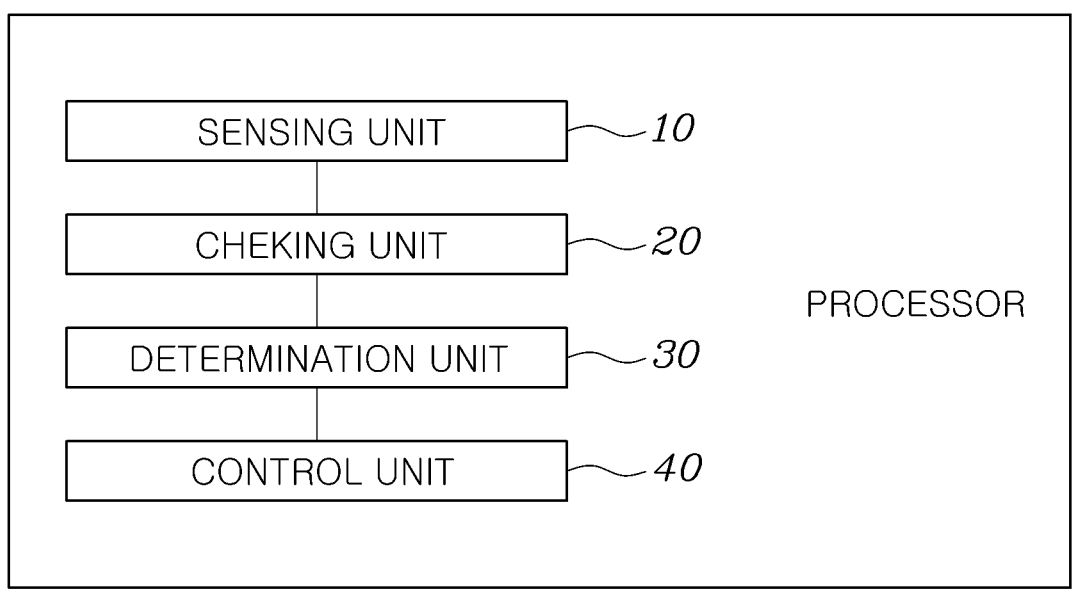
FIG. 1 is a block diagram of a rear side warning system for a vehicle according to an embodiment of the present invention.

Specific structural or functional descriptions of the embodiments of the present invention disclosed in the present specification or application are presented by way of examples only for the purpose of describing the embodiments according to the present invention, and the embodiments according to the present invention may be implemented in various forms and should not be construed as being limited to the embodiments described in the present specification or application.

Since the embodiments according to the present invention may be modified in various ways and have various forms, specific embodiments will be illustrated in the drawings and described in detail in the present specification or application. However, this is not intended to limit the embodiments according to the concept of the present invention to a specific disclosure form and should be construed as including all modifications, equivalents, and substitutes included in the spirit and technical scope of the present invention.

Terms such as first and/or second may be used to describe various components, but the components should not be limited by the terms. The terms only serve the purpose of distinguishing one component from other components. For example, the first component may be referred to as the second component, and similarly, the second component may also be referred to as the first component without deviating from the scope of the right according to the concept of the present invention.

When a component is referred to as being "connected" or "coupled" to another component, it may be directly connected or coupled to the another component, but it should be understood that other components may exist in between. On the other hand, when a component is referred to as being "directly connected" or "directly coupled" to another component, it should be understood that there is no other component in between. Other expressions describing the relationship between components such as "between" and "just between" or "adjacent to" and "directly adjacent to" should be interpreted in the same manner.

The terms used in the present specification are only used to describe specific embodiments and are not intended to limit the present invention. Singular expressions include plural expressions unless the context clearly indicates otherwise. In the present specification, terms such as "comprise" or "have" are intended to designate the presence of implemented features, numbers, steps, actions, components, parts, or combinations thereof and should not be understood to preclude the presence or additional possibilities of one or more of other features, numbers, steps, actions, components, parts or combinations thereof in advance.

Unless otherwise defined, all terms used herein, including technical or scientific terms, have the same meanings as are generally understood by those with common knowledge in the art to which the present invention belongs. The terms such as those defined in a generally used dictionary should be interpreted as having meanings consistent with the meanings in the context of the related technology and should not be interpreted as an idealistic or excessively formal meaning unless explicitly defined in the present specification.

Hereinafter, the present invention will be described in detail by describing preferred embodiments of the present invention with reference to the accompanying drawings. The same reference numerals shown in each drawing indicate the same members.

A sensing unit 10, a determination unit 30, and a control unit 40 according to an exemplary embodiment of the present invention may be implemented through a processor configured to perform operations to be described below using an algorithm configured to control the operations of various components of a vehicle 100 or a nonvolatile memory (not shown) configured to store data relating to software commands for reproducing the algorithm and the data stored in the memory. Here, the memory and the processor may be implemented as individual chips. Alternatively, the memory and processor may be implemented as an integrated single chip. The processor may take the form of one or more processors.

A preferred embodiment of the rear side warning system for the vehicle 100 according to the present invention will be described with reference to FIGS. 1 to 6.

Figure 2:
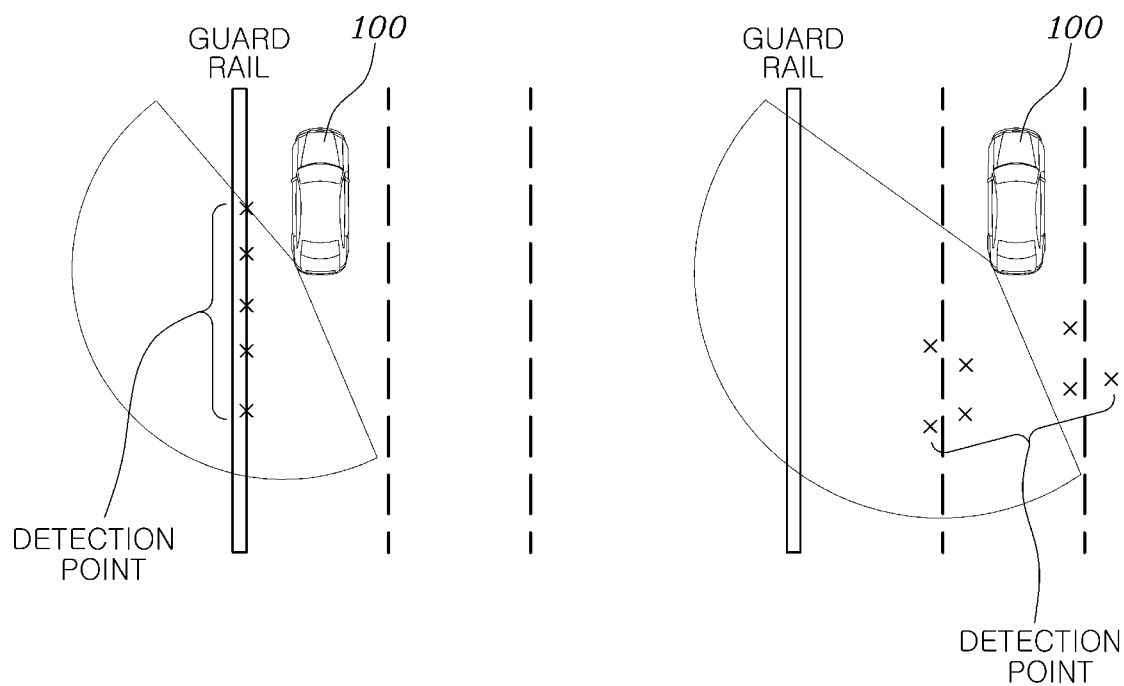
FIG. 2 is a diagram showing a detection error caused by a guard rail in a conventional rear side warning system for a vehicle.
Figure 3:
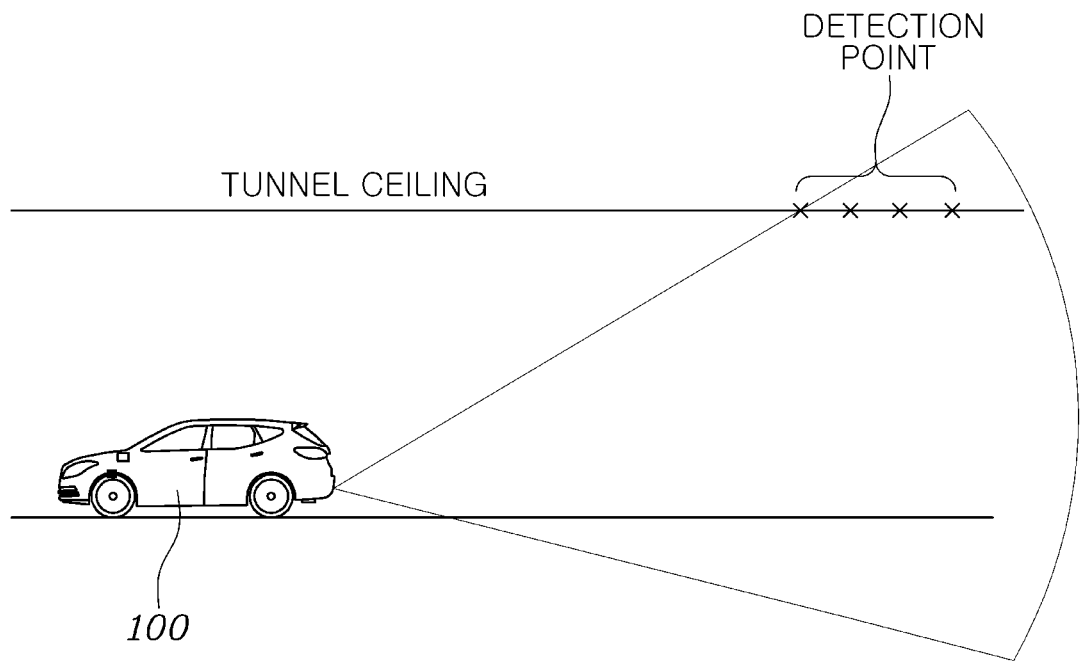
FIG. 3 is a diagram showing a detection error caused by a tunnel in a conventional rear side warning system for a vehicle.
Figure 4:
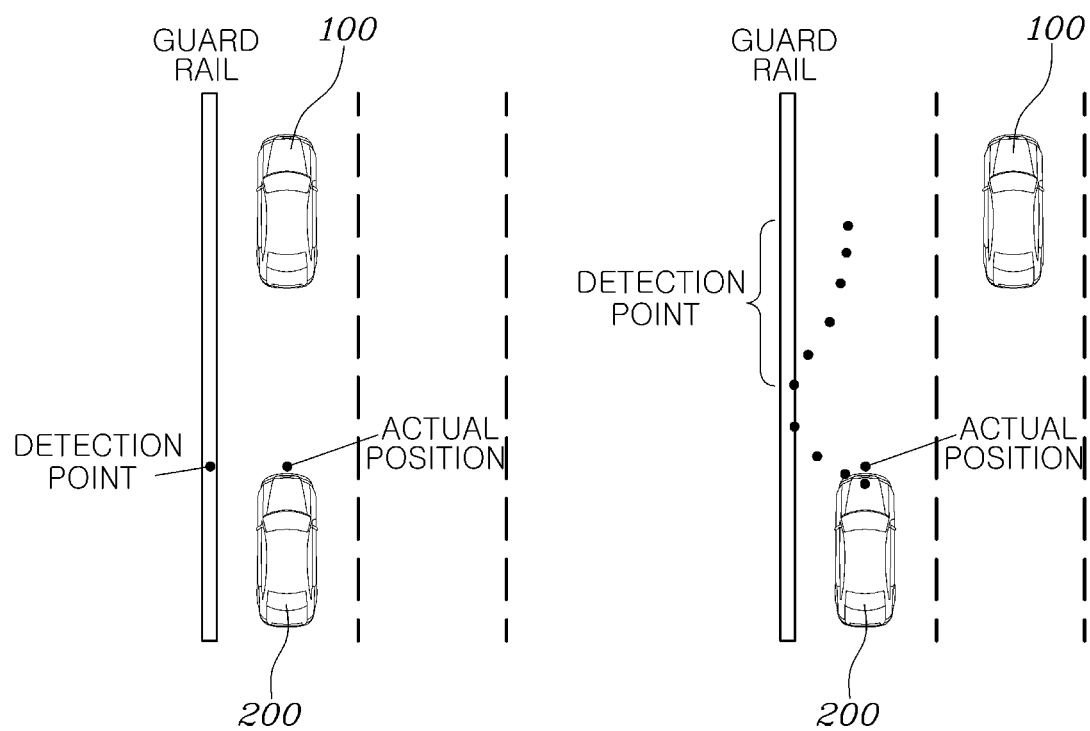
FIG. 4 is a diagram showing a detection error of an external vehicle caused by a guard rail in a conventional rear side warning system for a vehicle.

FIG. 1 is a block diagram of a rear side warning system for a vehicle 100 according to an embodiment of the present invention. FIG. 2 is a diagram showing a detection error caused by a guard rail in a conventional rear side warning system for a vehicle 100. FIG. 3 is a diagram showing a detection error caused by a tunnel in the conventional rear side warning system for a vehicle 100. FIG. 4 is a diagram showing a detection error of an external vehicle 100 caused by a guard rail in the conventional rear side warning system for a vehicle 100.

The rear side warning system for the vehicle 100 according to the present invention is a system generating a rear side warning signal to a driver when an obstacle such as an external vehicle 100 exists on a rear side in a situation where the vehicle 100 moves to right or left while the vehicle 100 travels.

The rear side warning system for the vehicle 100 according to the present invention may sense an obstacle, which is positioned in the rear or on the side and may collide with the vehicle 100, through a detection sensor such as a radar sensor or an ultrasonic sensor mounted in the rear, or on the side, of the vehicle 100 and generate a signal to a driver.

In addition, when the obstacle positioned in the rear or on the side enters a preset warning generation range, a rear side warning signal may be generated, and when the obstacle remains in a warning-keeping range that is smaller than the preset warning generation range, the rear side warning signal is maintained so as to warn the driver to sense the obstacle positioned on the rear side.

Further reference to FIGS. 2 to 4 shows that the rear side warning system for the vehicle 100 according to the present invention is invented to prevent a false rear side warning caused by the signals being reflected from a guard rail or an outer wall of a tunnel and received by the detection sensor while the vehicle 100 travels on a road close to a stationary obstacle such as the guard rail or the tunnel.

FIG. 1 is a block diagram showing the rear side warning system for the vehicle 100 according to the embodiment of the present invention.

The rear side warning system for the vehicle 100 according to the present invention includes a detection unit 10 detecting an external obstacle of the vehicle 100; a determination unit 30 classifying the external obstacle sensed by the sensing unit 10 as a fixed object or a moving object 200; and a control unit 40 controlling the rear side warning signal of the vehicle 100 based on the type of the external obstacle determined by the determination unit 30.

The sensing unit 10 may sense an external obstacle of the vehicle 100 through a detection sensor such as a radar sensor or an ultrasonic sensor mounted on an exterior of the vehicle 100.

Further reference to FIGS. 2 and 3 shows that the determination unit 30 may determine whether the external obstacle is a moving object 200 or a fixed object such as a guard rail or an external wall of a tunnel based on the information of the external obstacle sensed by the sensing unit 10.

The control unit 40 may generate a rear side warning signal of the vehicle 100 based on the moving object 200 and fixed object determined by the determination unit 30.

This has the effect of allowing the driver to watch the rear side and drive safely.

Figure 5:
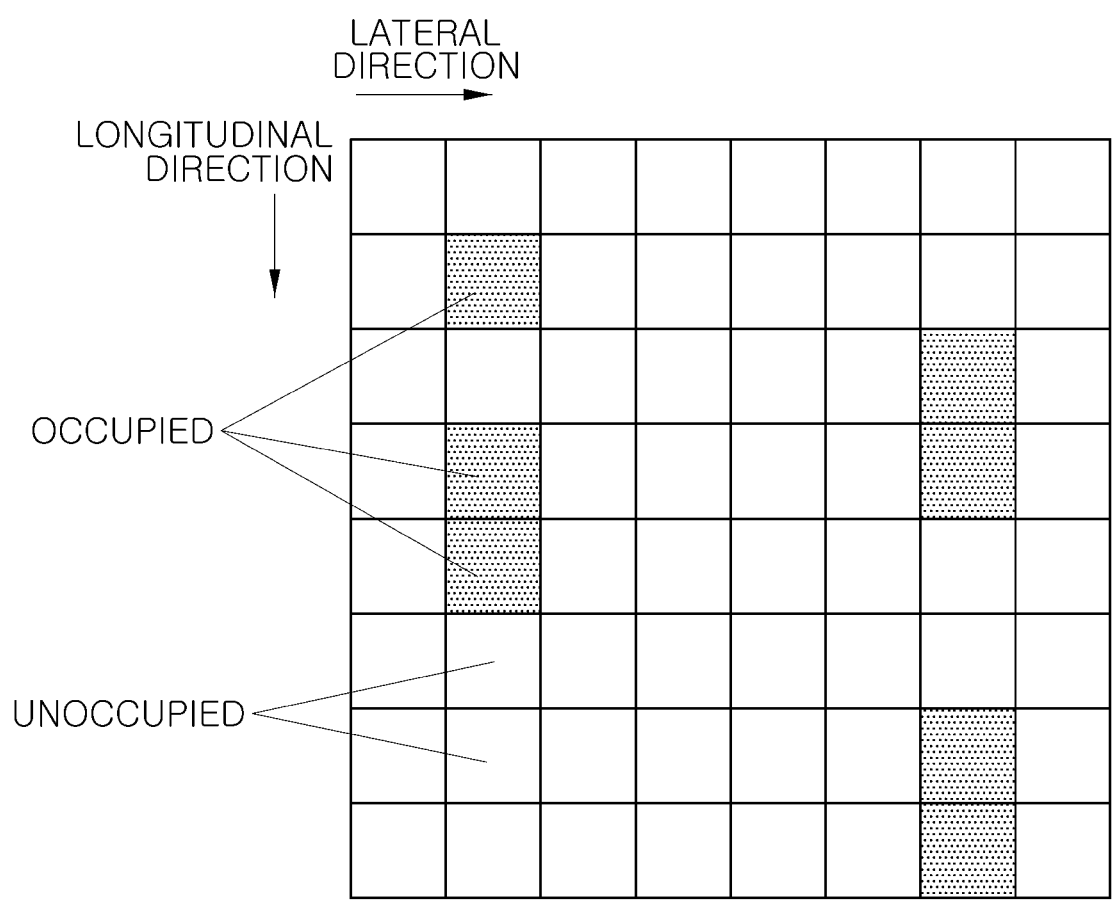
FIG. 5 is a diagram showing a grid shape detection in a rear side warning system for a vehicle according to an embodiment of the present invention.

FIG. 5 is a diagram showing a grid shape detection in the rear side warning system for the vehicle 100 according to an embodiment of the present invention.

The sensing unit 10 divides a sensing range into a grid shape formed by a plurality of longitudinal and lateral axes and senses an external obstacle when a grid cell where a plurality of longitudinal and lateral axes cross is occupied.

Further reference to FIG. 5 shows that the sensing unit 10 may divide the range sensed by the detection sensor into a grid shape where a plurality of longitudinal and lateral axes cross each other and sense an external obstacle being positioned when the external obstacle occupies a grid cell.

This allows the position of the obstacle to be sensed on a plane and be converted into an electrical signal.

When the positions of the external obstacle sensed by the sensing unit 10 are continuously sensed as being positioned within preset intervals in the longitudinal direction, the determination unit 30 determines that the external obstacle is a fixed object.

When the sensing unit 10 senses that an external obstacle occupies grid cells into which the sensing range is divided and that the external obstacle occupying the grid cells is within a preset distance in the longitudinal direction or that the external obstacles occupy less than a preset number of grid cells in the longitudinal direction, the determination unit 30 determines that the plurality of obstacles sensed in the longitudinal direction are the same obstacle and that the same obstacle is a fixed object.

According to the present invention, the fixed object is a fixed object such as a guard rail, a noise barrier, a tunnel ceiling, and the like positioned on either side of the driving road and is composed of materials interfering with the sensing by the rear side detection sensor of the vehicle 100.

This has the effect of accurately sensing the external obstacle moving in the rear or on the side by classifying the external obstacle as a fixed object or a moving object 200.

The determination unit 30 calculates the lateral distance between the fixed object and the vehicle 100 and determines the position of the moving object 200 on the rear side of the vehicle 100 based on the calculated lateral distance.

The determination unit 30 may calculate, and store in a storage medium, the lateral distance between the fixed object sensed by the sensing unit 10 and the vehicle 100 and determine the continuous position of the fixed object through the stored lateral distance between the vehicle 100 and the fixed object.

This allows the determination unit 30 to distinguish between the fixed object and the moving object 200, thereby having the effect of preventing a false determination of the fixed object as the moving object 200.

When the change of the lateral distance, calculated by the determination unit 30, between the fixed object and the vehicle 100 is less than a preset first distance, the control unit 40 holds back the rear side warning signal on the side of the fixed object.

Further reference to FIG. 4 shows that the moving object 200 cannot approach the side of the vehicle 100 on the side of the fixed object when no road exists between the vehicle 100 and the fixed object positioned on the side and the vehicle 100 travels close to the fixed object.

At this time, the control unit 40 may control the sensing unit 10 to sense the moving object 200 on the move in the rear of the vehicle 100 and hold back the rear side warning signal on the side of the fixed object. This prevents confusion on the part of the driver by not generating the rear side warning signal on the side of the fixed object to the driver.

When the change of the lateral distance, calculated by the determination unit 30, between the fixed object and the vehicle 100 is within a preset range, the control unit 40 holds back the generation of the rear side warning signal against the moving object 200 other than the fixed object.

Further reference to FIG. 4 shows that a road exists between the vehicle 100 and the fixed object, that the sensing unit 10 may preset a range for a fixed object to be positioned inside a sensing range, and that the control unit 40 may generate a rear side warning signal against the moving object 200 other than the fixed object inside the preset range.

When the moving object 200 moves, the sensing unit 10 may be confused in sensing the fixed object and moving object 200, and when the moving object 200 other than the fixed object approaches the vehicle 100, the control unit 40 may generate the rear side warning signal of the vehicle 100.

This has the effect of preventing an premature turn-off of the rear side warning signal caused by the determination unit 30 determining that the moving object is outside the rear side sensing range caused by the sensing unit 10 sensing, due to the fixed object, that the moving object 200 is positioned outside the rear side warning range even though the moving object 200 is positioned inside the rear side warning range when the moving object 200 moves.

When the number of positions of the fixed object sensed by the sensing unit 10 during a preset time period is equal to or greater than a preset number, the determination unit 30 determines that the vehicle 100 enters a driving road having a limited height.

Further reference to FIG. 3 shows that, when the vehicle 100 enters a tunnel or a driving road having a limited height, the sensing unit 10 may sense the ceiling of the driving road as a fixed object, and the ceiling of the driving road may be sensed at a position spaced a certain distance apart from the vehicle 100 depending on the angle of the sensing range of the detection sensor.

The number of positions of the fixed object sensed by the sensing unit 10 as the fixed object such as a guard rail increases on the driving road having a ceiling. The sensing unit 10 may check the number of fixed obstacles occupying the grid cells in the sensing range divided in a grid shape, the determination unit 30 may determine that the vehicle 100 enters the driving road having a limited height when the number of grid cells determined to be a fixed object is equal to or greater than a preset number and determine that the vehicle 100 left the driving road having a limited height when the number determined to be a fixed object is equal to or less than a preset number.

The determination unit 30 may sense the ceiling of the driving road as a fixed object to distinguish it from the moving object 200, and this has the effect of more accurately sensing the moving object 200.

When the determination unit 30 determines that the vehicle entered the driving road having a limited height, the fixed object sensed by the sensing unit 10 is positioned a second distance or more away where a longitudinal sensing range is preset, the number of sensed positions of the fixed object being equal to or greater than a preset number.

Further reference to FIG. 3 shows that the second distance may be preset depending on the angle of the sensing range of the detection sensor connected to the sensing unit 10, that the ceiling of the road having a limited height of the preset second distance or more may be sensed as the fixed object, and that the second distance may be preset depending on the type of vehicle 100 or the type of sensor.

When the determination unit 30 determines that the vehicle enters the driving road having a limited height, the control unit 40 expands the rear side warning-keeping area of the sensing unit 10 or increases the rear side warning-keeping time.

When the vehicle 100 enters the driving road having a limited height, the sensing unit 10 may be confused in sensing the moving object 200 and the fixed object by sensing more fixed objects. To prevent his, when the determination unit 30 determines the vehicle 100 enters the driving road having a limited height, the control unit 40 expands the rear side warning-keeping area where the warning is set off when the moving object 200 enters a preset area of the sensing area sensed by the sensing unit 10, or increases the rear side warning-keeping time of the moving object 200, so that there is the effect of preventing an inaccurate detection of the moving object 200 caused by the ceiling of the driving road having a limited height.

When the vehicle 100 moves a preset third distance or more in the longitudinal direction, the determination unit 30 resets the position of the fixed object.

Figure 6:
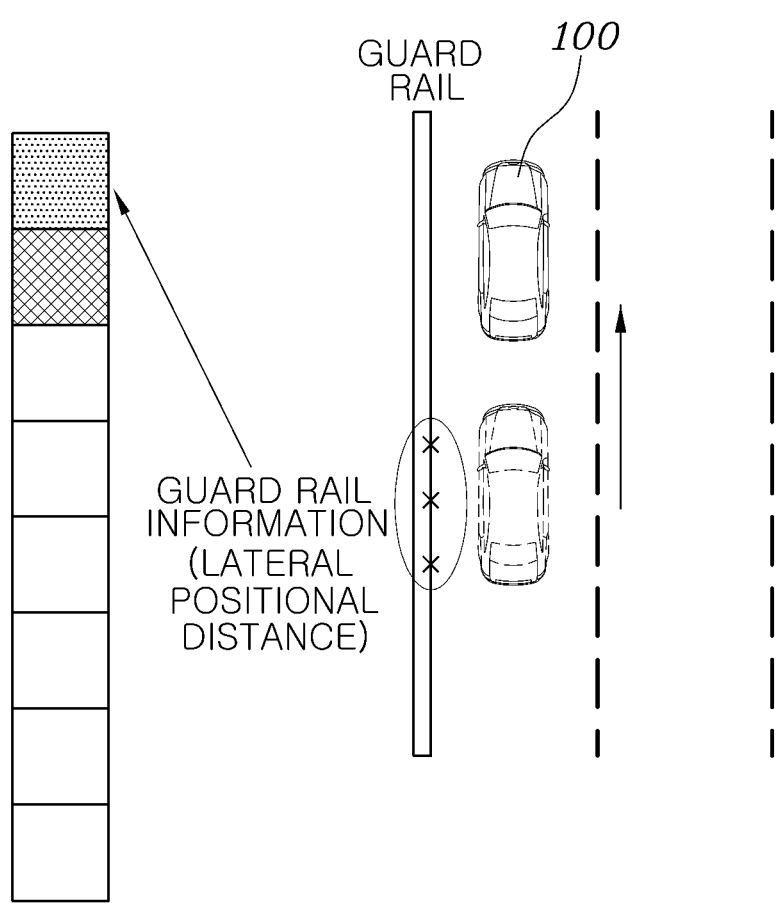
FIG. 6 is a diagram showing an update of guard rail information in a rear side warning system for a vehicle according to an embodiment of the present invention.

FIG. 6 is a diagram showing an update of guard rail information in a rear side warning system for a vehicle according to an embodiment of the present invention.

Further reference to FIG. 6 shows that, when the vehicle 100 moves forward the third distance or more, the position of the fixed object may change or disappear, that, to check it out, the determination unit 30 may reset the lateral position of the fixed object when the vehicle 100 moves the preset third distance or more in the longitudinal direction, and that, by storing this in the storage medium, the continuous position of the fixed object may be checked.

In addition, the determination unit 30 may store new information of the fixed object for every preset third distance for an update.

This has the effect of preventing a false generation of the rear side warning signal to the driver by sensing the fixed object as the moving object 200.

When the change of the lateral distance between the vehicle 100 and the fixed object increases or decreases from a preset fourth distance, the determination unit 30 resets the position of the fixed object.

Further reference to FIG. 4 shows that the lateral distance between the fixed object and the vehicle 100 may change as the vehicle 100 moves in the lateral direction while the vehicle 100 travels or the number of lanes increases or decreases.

At this time, as the position of the fixed object changes, the determination unit 30 of the vehicle 100 may correct and sense the lateral position of the fixed object sensed by the sensing unit 10. Accordingly, there is the effect of accurately sensing the moving object 200 positioned in the rear, or on the side, of the vehicle 100 according to the lateral position of the fixed object.

Figure 8:
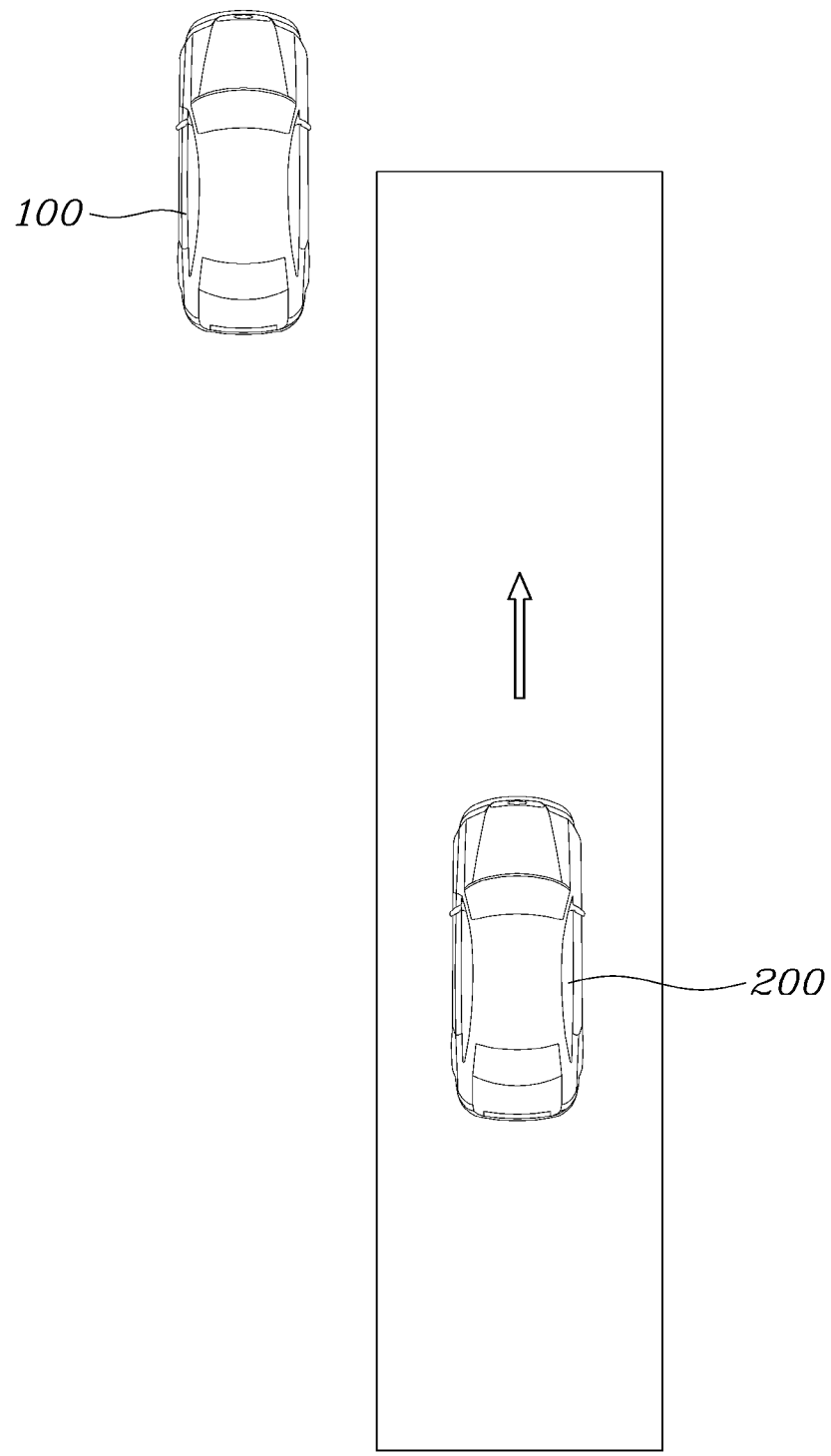
FIG. 8 is a diagram showing a rear side warning condition at the time of a lane change in a rear side warning system for a vehicle according to an embodiment of the present invention.
Figure 9:
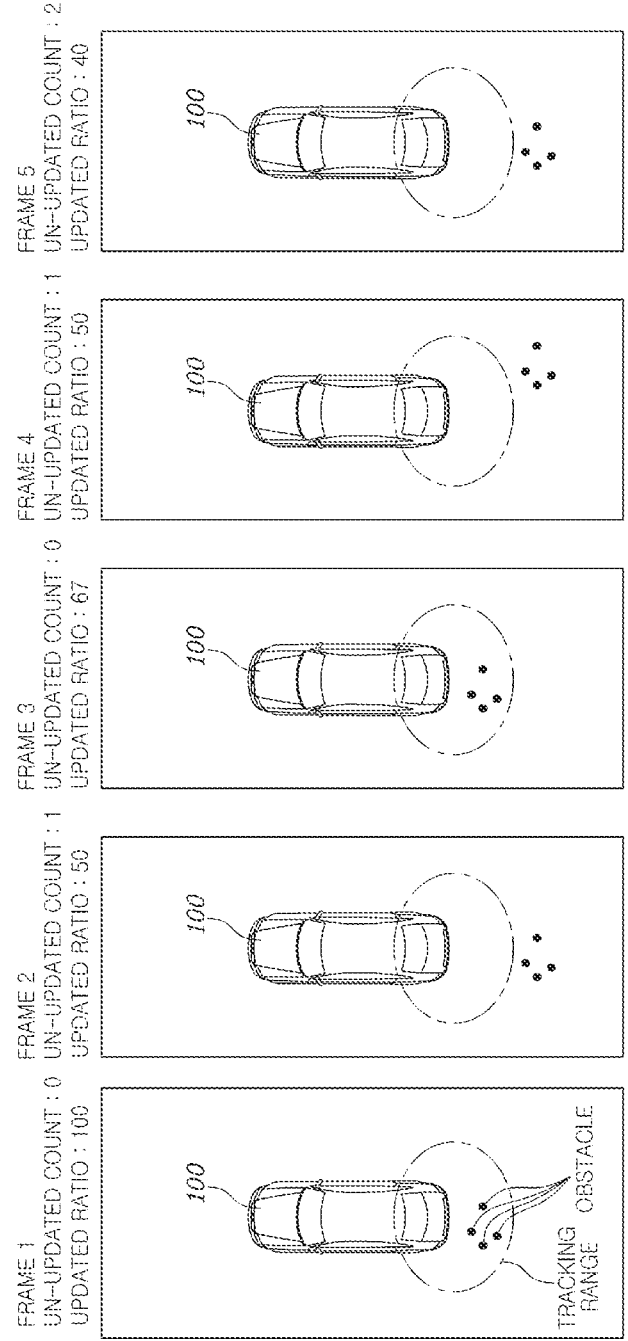
FIG. 9 is a diagram showing a tracking of an external obstacle in a rear side warning system for a vehicle according to an embodiment of the present invention.

FIG. 8 is a diagram showing a rear side warning condition at the time of a lane change in a rear side warning system for a vehicle according to an embodiment of the present invention. FIG. 9 is a diagram showing a tracking of an external obstacle in a rear side warning system for a vehicle according to an embodiment of the present invention.

The rear side warning system for the vehicle 100 according to the present invention specifically includes the sensing unit 10 sensing the position information or movement information of the moving object 200 positioned outside; the checking unit 20 checking the preset rear side warning condition based on the position information or movement information of the moving object 200 sensed by the sensing unit 10; the determination unit 30 determining a reliability condition of the rear side warning condition checked by checking unit 20 based on the position information or movement information of the moving object 200 sensed by the sensing unit 10; and the control unit 40 generating the rear side warning signal of the vehicle 100 based on the reliability conditions of the rear side warning condition checked by the checking unit 20 and the rear side warning condition determined by the determination unit 30.

Further reference to FIGS. 1 to 9 shows that the sensing unit 10 may sense the external moving object 200 moving in the rear, or on the side, of the vehicle 100. The external moving object 200 may be composed of an external vehicle 100 travelling on the driving road of the vehicle 100, a motorcycle, or moving object 200 on the move.

The position information of the moving object 200 sensed by the sensing unit 10 may be composed of the lateral and longitudinal distances between the host vehicle and the moving object 200 and the movement information of the moving object 200 may be composed of longitudinal and lateral moving speeds of the moving object 200.

When the external vehicle 100 is positioned in the rear, or on the rear side, of the host vehicle in FIG. 8, the checking unit 20 may check the preset rear side warning condition and cause the control unit 40 to generate the rear side warning signal.

When the external vehicle 100 exists inside the warning area based on the longitudinal and lateral positions of the external vehicle 100 and the value obtained from dividing the longitudinal position by the longitudinal speed is within a preset value, the preset rear side warning condition in the present invention may satisfy the rear side warning condition of the vehicle 100. The rear side warning condition of the vehicle 100 may vary depending on the vehicle 100.

The determination unit 30 may determine the reliability condition of the rear side warning condition checked by the checking unit 20 based on the position information or movement information of the moving object 200 sensed by the sensing unit 10.

The sensing unit 10 may sense false position information and movement information of the moving object 200, which may be checked out by the checking unit 20, and in order not to issue a false warning to the driver, the determination unit 30 may determine the reliability condition of the rear side warning condition based on the position information and movement position of the moving object 200 and the control unit 40 may hold back the warning signal when the condition is not satisfied.

Based on the reliability conditions of the rear side warning condition checked by the checking unit 20 and the rear side warning condition determined by the determination unit 30, the control unit 40 may generate the rear side warning signal to the driver of the vehicle 100 when the two conditions are satisfied.

The sensing unit 10 senses the position information or movement information of the moving object 200 positioned in the rear, or on the side, of the vehicle 100 through the radar sensor 1 mounted in the vehicle 100.

The sensing unit 10 may sense the longitudinal and lateral positions and longitudinal and lateral speeds of the moving object 200 on the move in the rear, or on the side, of the vehicle 100 through the radar sensor mounted in the vehicle 100.

The checking unit 20 may check the rear side warning condition of the vehicle 100 based on the longitudinal and lateral positions and the longitudinal and lateral speeds of the moving object 200.

The sensing unit 10 may sense the moving object 200 in connection with the sensing device such as the radar sensor as well as the ultrasonic sensor configured to sense the external moving object 200 of the vehicle 100.

The determination unit 30 determines the reliability condition of the rear side warning condition based on the position information including the longitudinal and lateral positions of the moving object 200 or movement information including the longitudinal and lateral speeds of the moving object 200.

The position information and movement information of the moving object 200 on the move in the rear, or on the side, of the vehicle 100 are sensed by the sensing unit 10, the longitudinal and lateral positions of the moving object 200 are included in the position information, and the longitudinal and lateral speeds of the moving object 200 are included in the movement information.

The determination unit 30 may check out that the reliability condition of the rear side collision warning condition checked by the checking unit 20 based on the longitudinal and lateral positions and the longitudinal and lateral speeds of the moving object 200 is satisfied.

The reliability condition of the rear side collision warning condition is as follows.

The sensing unit 10 senses the position information or movement information of the moving object 200 in each frame, and the determination unit 30 sets the tracking range based on the position information or movement information of the moving object 200 sensed in the previous frame and determines the reliability condition of the rear side warning condition based on whether the position information or movement information of the moving object 200 sensed in the current frame is inside the preset tracking range.

Further reference to FIG. 9 shows that the sensing unit 10 may sense the position information and movement information of the external vehicle 100 with a radar sensor frame by frame of the external vehicle 100, and the determination unit 30 may set the tracking range having a preset range based on the position information and movement information of the moving object 200 in the previous frame and track the moving object 200 on the move by checking whether the position information and movement information of the moving object 200 is positioned inside the tracking range in the current frame.

When more positions of the moving object 200 are sensed than a preset frames inside the tracking range, the determination unit 30 may determine that the reliability condition of the rear side warning condition is satisfied.

The determination unit 30 cumulatively counts the number of times the position information or movement information of the moving object 200 sensed in the current frame is outside the preset tracking range and determines that the reliability condition of rear side warning condition is not satisfied when the cumulatively counted number is equal to or greater than the preset first number.

Further reference to FIG. 9 shows that the number of frames in which the position information or movement information of the moving object 200 is outside the tracking range is recorded as un-updated count. When the cumulative number of times the un-updated count continuously occurs is equal to or greater than the preset first number, the determination unit 30 may determine that the reliability condition of the rear side warning condition checked by the checking unit 20 is not satisfied. The failure to satisfy the reliability condition of the rear side warning condition is due to the determination unit 30 determining that the tracking is a false tracking caused by a sensing error of a radar sensor.

This allows application of the rear side warning system for the vehicle 100 according to the present invention to a low-cost radar sensor having poor capability of sensing the moving object 200 and has the effect of improving rear side sensing capability of the radar sensor, thereby having the effect of cost cut.

The determination unit 30 cumulatively counts the number of times the position information or movement information of the moving object 200 sensed in the current frame is outside the preset tracking range and ends the tracking of the sensed moving object 200 when the cumulatively counted number is equal to or greater than a preset second number.

Further reference to FIG. 9 shows that the position information and movement information of the moving object 200 are continuously sensed outside the tracking range in frames 4 and 5 and that the determination unit 30 of the vehicle 100 ends the tracking of the moving object 200 and starts to track a new moving object 200 when the un-updated count increases to or over the preset second number.

The preset second number may vary depending on the type of vehicle 100 and the type of detection sensor such as a radar sensor to which the number is applied and may be preset to the optimal number.

This has the effect of more effectively tracking the moving object 200 positioned in the rear or on the side.

The determination unit 30 determines the reliability condition of the rear side warning condition based on whether the position information or movement information of the moving object 200, the longitudinal distance of which to the vehicle 100 is equal to or greater than a preset distance, is inside the preset tracking range based on the position information of the moving object 200 sensed in the current frame.

When the longitudinal distance to the vehicle 100 based on the position information of the moving object 200 sensed by the sensing unit 10 is basically equal to or greater than a preset distance, the determination unit 30 may determine that the reliability condition of the rear side warning condition is not satisfied, and even when a moving object 200 positioned a preset distance or more away is tracked, the determination unit 30 may determine that this is a false tracking to end the tracking and start to track a new moving object 200 within a predetermined distance in the longitudinal direction.

This has the effect of more effectively tracking the moving object 200 positioned in the rear on the side.

The determination unit 30 cumulatively counts the number of times the position information or movement information of the moving object 200 sensed in the current frame is positioned inside the preset tracking range and determines that the reliability condition of the rear side warning condition is not satisfied when the cumulatively counted number is equal to or less than a preset ratio with respect to the total frames in which the position information or movement information of the moving object 200 is sensed.

Further reference to FIG. 9 shows that the number of times the position information or movement information of the moving object 200 sensed in the current frame is positioned inside the preset tracking range is counted and that the ratio of frames in which the moving object 200 is positioned inside the tracking range to the total number of frames from the tracking start frame to the current frame is described as an updated ratio in FIG. 9.

When the updated ratio falls to or below a preset ratio and the tracked moving object 200 is not inside the preset tracking range, the determination unit 30 may determine that it is a false tracking to end the tracking and start to track a new moving object 200.

This has the effect of improving the accuracy with which the radar sensor tracks the moving object 200. In addition, the rear side warning system for the vehicle 100 according to the present invention may be applied to low-cost radar, thus having the effect of cost cut.

When the determination unit 30 determines that the reliability condition of the rear side warning condition is the preset condition, the control unit 40 holds back the rear side warning signal of the vehicle 100.

When the determination unit 30 determines that any one of the reliability conditions of the rear side warning conditions is not satisfied, the control unit 40 may hold back the generation of the rear side warning signal of the vehicle 100.

Accordingly, when the reliability condition of the rear side warning condition is not satisfied even if the rear side warning condition is satisfied in the checking unit 20, it is determined that the tracking of the moving object 200 sensed by the sensing unit 10 is a false tracking, and the subsequent rear side warning signal is held back so that no false signal is generated to the driver. This allows a more accurate generation of the rear side warning signal of the vehicle 100.

The sensing unit 10 senses the position information or movement information of the moving object 200 in each frame, the checking unit 20 cumulatively counts the number of times the position information or movement information of the moving object 200 sensed in each frame satisfies the preset rear side warning condition, and the control unit 40 generates the rear side warning signal of the vehicle 100 when the cumulatively counted number of times the preset rear side warning condition is satisfied is equal to or greater than the preset number of warnings and increases the preset number of warnings when the determination unit 30 determines that the reliability condition of the rear side warning condition is the preset condition.

The rear side warning condition of the rear side warning system for the vehicle 100 according to the present invention is based on the position information and movement information of the moving object 200 sensed by the sensing unit 10 such that the checking unit 20 may check the rear side warning condition by putting the position information and movement information of the moving object 200 in a preset formulation, and the control unit 40 may generate the rear side warning signal to the driver through an instrument cluster of the vehicle 100 or a rear side collision warning signal device provided at a side view mirror of the vehicle 100 when the number of frames where the rear side warning condition is satisfied among the frames sensed by the sensing unit 10 and the rear side warning condition determined by the determination unit 30 is satisfied.

Figure 7:
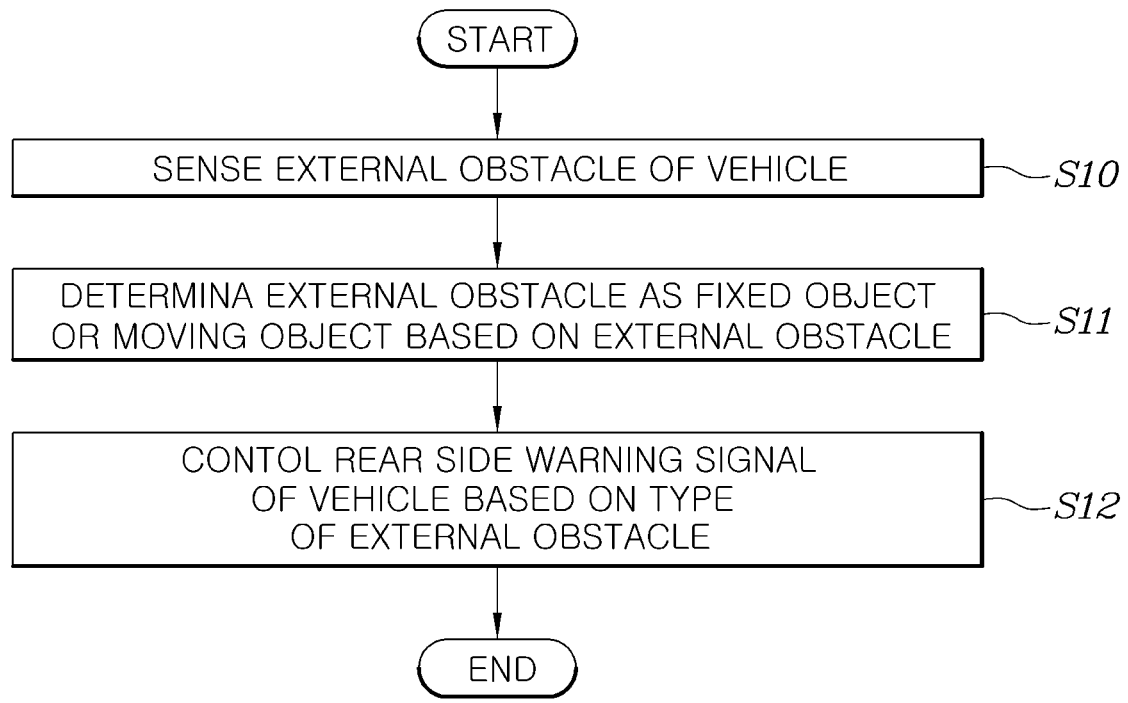
FIG. 7 is a flow chart of a rear side warning method for a vehicle according to an embodiment of the present invention.

FIG. 7 is a flow chart of a rear side warning method for a vehicle according to an embodiment of the present invention.

A preferred embodiment of a vehicle control method according to the present invention will be described with reference to FIG. 7.

The rear side warning method of the vehicle 100 according to the present invention includes a sensing step S10 where the external obstacle of the vehicle 100 is sensed; a determination step S11 where the external obstacle sensed in the sensing step S10 is classified as the fixed object or the moving object 200; and a control step S12 where the rear side warning signal of the vehicle 100 is controlled based on the type of external obstacle determined in the determination step S11.

In the sensing step S10, the sensing range is divided into a grid shape formed by a plurality of longitudinal and lateral axes and an external obstacle is sensed when a grid cell where a plurality of longitudinal and lateral axes cross is occupied.

In the determination step S11, when the positions of the external obstacle sensed in the sensing step S10 are continuously sensed as being positioned within preset intervals in the longitudinal direction, it is determined that the external obstacle is a fixed object.

In the determination step S11, the lateral distance between the fixed object and the vehicle 100 is calculated and the position of the moving object 200 on the rear side of the vehicle 100 is determined based on the calculated lateral distance.

In the control step S12, when the change in the lateral distance, calculated in the determination step S11, between the fixed object and the vehicle 100 is less than the preset first distance, the rear side warning signal on the side of the fixed object is held back.

In the control step S12, when the change of the lateral distance, calculated in the determination step S11, between the fixed object and the vehicle 100 is within the preset range, generation of the rear side warning signal against the moving object 200 other than the fixed object is held back.

In the determination step S11, when the number of positions of the fixed object sensed in the sensing step S10 during a preset time period is equal to or greater than the preset number, it is determined that the vehicle 100 enters a driving road having a limited height.

The fixed object sensed in the sensing step S10 is position the present second distance or more away where the longitudinal sensing range is preset, the number of sensed positions of the fixed object being equal to or greater than a preset number.

In the step S12, when it is determined in the determination step S11 that the vehicle enters a driving road having a limited height, the rear side warning-keeping area of the sensing step S10 is expanded or the rear side warning-keeping time is increased.

When the vehicle 100 moves the preset third distance in the longitudinal direction, the position of the fixed object is reset in the determination step S11.

When the change of the lateral distance between the vehicle 100 and the fixed object increases or decrease from the preset fourth distance, the position of the fixed object is reset in the determination step S11.

Figure 10:
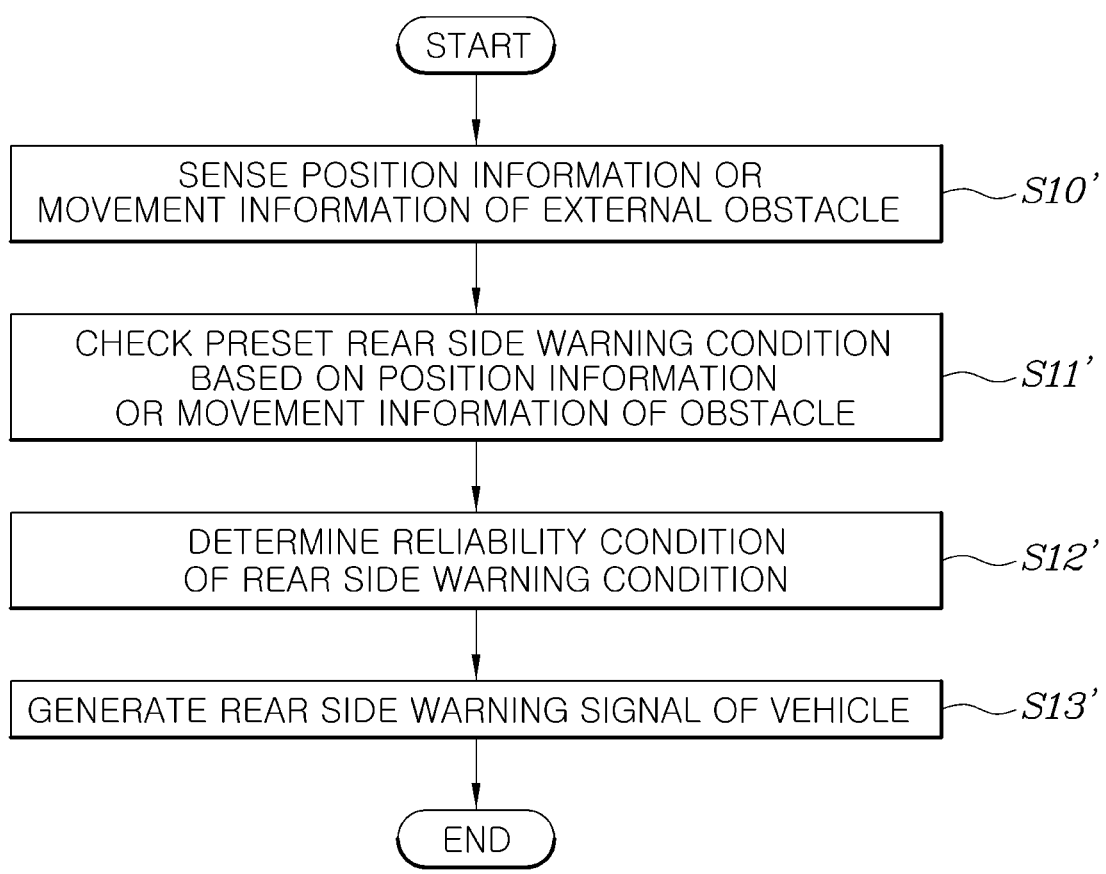
FIG. 10 is a flow chart of a rear side warning method for a vehicle according to an embodiment of the present invention.

FIG. 10 is a flow chart of a rear side warning method for the vehicle 100 according to an embodiment of the present invention.

The rear side warning method of the vehicle 100 according to the present invention will be described with reference to FIG. 10.

The rear side warning method of the vehicle 100 according to the present invention includes a sensing step S10' where the position information or movement information of the moving object 200 positioned outside is sensed; a checking step S11' where the preset rear side warning condition is checked based on the position information or movement information of the moving object 200 sensed in the sensing step S10'; a determination step S12' where the reliability condition of the rear side warning condition checked in the checking step S11' is determined based on the position information or movement information of the moving object 200 sensed in the sensing step S10'; and a control step S13' where the rear side warning signal of the vehicle 100 is generated based on the reliability condition of the rear side warning condition checked in the checking step S11' and the rear side warning condition determined in the determination step S12'.

In the sensing step S10', the position information or movement information of the moving object 200 positioned in the rear, or on the side, of the vehicle 100 is sensed through a radar sensor mounted in the vehicle 100.

In the determination step S12', the reliability condition of the rear side warning condition is determined based on the position information including the longitudinal and lateral positions of the moving object 200 and the movement information including longitudinal and lateral speeds of the moving object 200.

In the sensing step S10', the position information or movement information of the moving object 200 is sensed in each frame, while, in the determination step S12', the tracking range is set based on the position information or movement information of the moving object 200 sensed in the previous frame and the reliability condition of the rear side warning condition is determined based on whether the position information or movement information of the moving object 200 sensed in the current frame is inside the preset tracking range.

In the determination step S12', the number of times the position information or movement information of the moving object 200 sensed in the current frame is outside the preset tracking range is cumulatively counted, and it is determined that the reliability condition of the rear side warning condition is not satisfied when the cumulatively counted number is equal to or greater than the preset first number.

In the determination step S12', the number of times the position information or movement information of the moving object 200 sensed in the current frame is outside the preset tracking range is cumulatively counted and the tracking of the sensed moving object 200 is ended when the cumulatively counted number is equal to or greater than the preset second number.

In the determination step S12', the reliability condition of the rear side warning condition is determined based on whether the position information or movement information of the moving object 200, the longitudinal distance of which to the vehicle 100 is equal to or great than the preset distance, is inside the preset tracking range based on the position information of the moving object 200 sensed in the current frame.

In the determination step S12', the number of times the position information or movement information of the moving object 200 sensed in the current frame is inside the preset tracking range is cumulatively counted, and it is determined that the reliability condition of the rear side warning condition is not satisfied when the cumulatively counted number is equal to or less than the preset ratio with respect to the total frames where the position information or movement information of the moving object 200 is sensed.

In the control step S13', when it is determined in the determination step S12' that the reliability condition of the rear side warning condition is the preset condition, the rear side warning signal of the vehicle 100 is held back.

The position information or movement information of the moving object 200 is sensed in each frame in the sensing step S10', the number of times the position information or movement information of the moving object 200 sensed in each frame satisfies the preset rear side warning condition is cumulatively counted in the checking step S11', and, in the control step S13', the rear side warning signal of the vehicle 100 is generated when the cumulatively counted number of times the preset rear side warning condition is satisfied is equal to or greater than the preset number of warnings and the preset number of warnings is increased when it is determined in the determination step S12' that the reliability condition of the rear side warning condition is the preset condition.

Specific embodiments of the present invention is illustrated and described, but it will be self-evident to those with common knowledge in the related art that the present invention may be improved and modified in various ways within the scope not deviating from the technical spirit of the present invention provided by the patent claims below.

What is claimed is:

1. A rear side warning system for a vehicle, comprising:
at least one processor configured to:
sense an external obstacle of the vehicle;
classify the external obstacle as either one of a fixed object and a moving object; and
control a rear side warning signal of the vehicle based on a result of the classifying of the external obstacle,
wherein the at least one processor comprises:
a sensing unit configured to sense the external obstacle;
a determination unit configured to classify the external obstacle as either one of the fixed object and the moving object; and
a control unit configured to control the rear side warning signal of the vehicle based on the result of the classifying of the external obstacle,
wherein the determination unit is further configured to determine that the vehicle enters a driving road having a limited height, in response to a number of positions of the fixed object sensed by the sensing unit during a preset time period being equal to or greater than a preset number; and
wherein in response to the vehicle entering the driving road having the limited height, the processor is further configured to expand a rear side warning-keeping area where a warning is set off when the moving object enters a preset area, or increase a rear side warning-keeping time.

2. The rear side warning system according to claim 1, wherein the sensing unit is further configured to divide a sensing range into a grid shape formed by a plurality of longitudinal and lateral axes, and detect the external obstacle in response to a grid cell where a longitudinal and lateral axis, among the plurality of longitudinal and lateral axes, cross is occupied.

3. The rear side warning system according to claim 1, wherein the determination unit is further configured to determine that the external obstacle is the fixed object, in response to positions of the external obstacle being continuously sensed as being positioned within preset intervals in a longitudinal direction.

4. The rear side warning system according to claim 1, wherein the determination unit is further configured to calculate a lateral distance between the fixed object and the vehicle, and determine a position of the moving object positioned on a rear side of the vehicle based on the calculated lateral distance, and
wherein the control unit is further configured to hold back generation of the rear side warning signal on a side of the fixed object in response to a change of the lateral distance, calculated by the determination unit, being less than a preset first distance.

5. The rear side warning system according to claim 4, wherein the determination unit is further configured to reset a position of the fixed object in response to the change of the lateral distance increasing or decreasing from a preset second distance.

6. The rear side warning system according to claim 4, wherein the control unit is further configured to hold back generation of the rear side warning signal against the moving object other than the fixed object in response to a change of the lateral distance, calculated by the determination unit, being within a preset range.

7. The rear side warning system according to claim 1, wherein the sensing unit is further configured to sense that the fixed object is positioned a preset distance or more away where a longitudinal sensing range is preset, when the determination unit determines that the vehicle enters the driving road having the limited height.

8. The rear side warning system according to claim 1, wherein the determination unit is further configured to reset a position of the fixed object in response to the vehicle moving a preset distance or more in a longitudinal direction.

9. A rear side warning method for a vehicle, the method comprising:
sensing an external obstacle of the vehicle;
classifying the sensed external obstacle as either one of a fixed object and a moving object; and
controlling a rear side warning signal of the vehicle based on a result of the classifying of the obstacle,
wherein the classifying the sensed external obstacle comprises determining that the vehicle enters a driving road having a limited height, in response to a number of positions of the fixed object sensed by the sensing unit during a preset time period being equal to or greater than a preset number, and
wherein the controlling of the rear side warning signal of the vehicle comprises, in response the vehicle entering the driving road having the limited height, expanding a rear side warning-keeping area where a warning is set off when the moving object enters a preset area, or increasing a rear side warning-keeping time.

* * * * *